(12) United States Patent
Lin

(10) Patent No.: US 10,301,048 B2
(45) Date of Patent: May 28, 2019

(54) CAP FOR A CUP CAPABLE OF REMOVING AIR CONTAINED IN THE CUP

(71) Applicant: Che Wei Lin, Tainan (TW)

(72) Inventor: Che Wei Lin, Tainan (TW)

( * ) Notice: Subject to any disclaimer, the term of this patent is extended or adjusted under 35 U.S.C. 154(b) by 82 days.

(21) Appl. No.: 15/710,836

(22) Filed: Sep. 21, 2017

(65) Prior Publication Data
US 2019/0084705 A1      Mar. 21, 2019

(51) Int. Cl.
| *B65B 31/04* | (2006.01) |
| *B65D 81/20* | (2006.01) |
| *B65D 41/04* | (2006.01) |

(52) U.S. Cl.
CPC ........ *B65B 31/047* (2013.01); *B65D 41/0428* (2013.01); *B65D 81/2038* (2013.01)

(58) Field of Classification Search
CPC .............. B65B 31/047; A47G 19/2272; A47G 19/2266; B65D 41/0428; B65D 41/0407; B65D 41/04; B65D 81/2038; B65D 81/2007; B65D 81/20; B65D 51/1672; B65D 51/1683; B65D 51/16; B65D 51/18; B65D 51/1644; B65D 51/1661
USPC ... 220/231, 254.8, 254.3, 254.1, 373, 367.1, 220/360, 715, 714, 711, 203.29, 203.19, 220/203.01; 215/311, 307
See application file for complete search history.

(56) References Cited

U.S. PATENT DOCUMENTS

| 4,016,999 | A | * | 4/1977 | Denzer | ................. | B65B 31/047 |
| | | | | | | 220/231 |
| 4,975,028 | A | * | 12/1990 | Schultz | ................. | A23L 3/0155 |
| | | | | | | 137/843 |
| 5,299,917 | A | * | 4/1994 | Schultz | ................. | B65B 31/047 |
| | | | | | | 417/238 |
| 5,347,918 | A | * | 9/1994 | Chen | ..................... | A47J 27/002 |
| | | | | | | 220/231 |
| 5,944,212 | A | * | 8/1999 | Chang | ................ | B65D 81/2038 |
| | | | | | | 215/228 |
| 2006/0231556 | A1 | * | 10/2006 | Wei | ........................ | B65B 31/047 |
| | | | | | | 220/203.18 |
| 2013/0160891 | A1 | * | 6/2013 | Vassallo | .................. | B65B 3/003 |
| | | | | | | 141/27 |
| 2013/0255830 | A1 | * | 10/2013 | Im | ...................... | B65D 81/2015 |
| | | | | | | 141/26 |
| 2018/0009589 | A1 | * | 1/2018 | Ho | ..................... | B65D 21/0219 |

FOREIGN PATENT DOCUMENTS

WO    WO-2012171563 A1 * 12/2012 ........... B65D 47/265

* cited by examiner

Primary Examiner — Robert J Hicks

(57) ABSTRACT

A cap for a cup includes a piston seat which includes a room, and an aperture is defined through the lower end of the piston seat. An air path communicates with the aperture. A check valve is movably engaged with the lower end of the piston seat and includes a plate which is deformable to control the air path to be opened or closed. A suction device is located in the piston seat and includes a position rod whose lower end is connected to a piston head which is located in the room of the piston seat. The upper end of the piston rod protrudes beyond the top end of the piston seat and is connected to a handle. By pulling and pushing the handle, the air in the cup is sucked out.

4 Claims, 6 Drawing Sheets

CAP FOR A CUP CAPABLE OF REMOVING AIR CONTAINED IN THE CUP

BACKGROUND OF THE INVENTION

1. Fields of the Invention

The present invention relates to a cap, and more particularly, to a cap for a cup and the cap has a suction device which sucks air from the interior of the cup to keep the beverage fresh.

2. Descriptions of Related Art

A cap is used to be mounted to the open top of a cup so as to keep the beverage in the cup from being contaminated. However, the cap can only keep foreign object from entering or dropping into the cup, the cap cannot prolong the freshness of the beverage in the cup because air in the cup is in contact with the beverage and may cause chemical reaction with the beverage. Some manufacturers develop a suction device which is an individual part from the cup and has to be precisely matched with the outlet of the cap. The suction device needs a room to be stored and the users have to carry it wherever the users go. The suction device is bulky and is not convenient for being carried.

The present invention intends to provide a cap for a cup and the cap includes its own suction device which can be easily operated to suck air out from the cup.

SUMMARY OF THE INVENTION

The present invention relates to a cap for a cup, and the cup comprises a cap for a cup. The cap comprises a piston seat and the piston seat has a room defined therein. An aperture and multiple air paths are defined through the lower end of the piston seat. At least two slots are defined in the top end of the position seat. A check valve is engaged with the aperture in the lower end of the piston seat and has a plate which is deformable to cover the air paths. A suction device is located in the piston seat and comprises a position rod, a positioning member and a handle. The piston rod is connected to the handle, and the piston rod comprises a piston head on the lower end thereof and a seal ring is mounted to the piston head. The piston head has at least one notch defined therein. The piston head is located in the room of the piston seat. The upper end of the piston rod protrudes beyond the top end of the piston seat. The positioning member is mounted to the top end of the piston seat and has a passage through which the piston rod extends. The positioning member has at least two studs, and the at least two studs are engaged with the at least two slots of the piston seat to fix the positioning member to the piston seat.

Preferably, the piston rod of the suction device has a washer mounted thereto.

Preferably, the piston rod of the suction device has a recess defined in the end face of the upper end thereof, and a stepped hole is defined in the piston rod and communicates with the recess. The handle has an insertion which is inserted into the recess. The insertion has a threaded hole. A bolt extends through the lower end of the piston rod and is threadedly connected to the threaded hole via the stepped hole so as to connect the handle to the piston rod.

Preferably, the cap includes a pressure-release hole and a pressure-release pin is located in the pressure-release hole. Preferably, the handle is glued to the upper end of the piston rod.

The primary object of the present invention is to provide a cap for a cup wherein the cap has its own suction device to suck the air in the cup out from the cup to keep freshness of the beverage in the cup.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
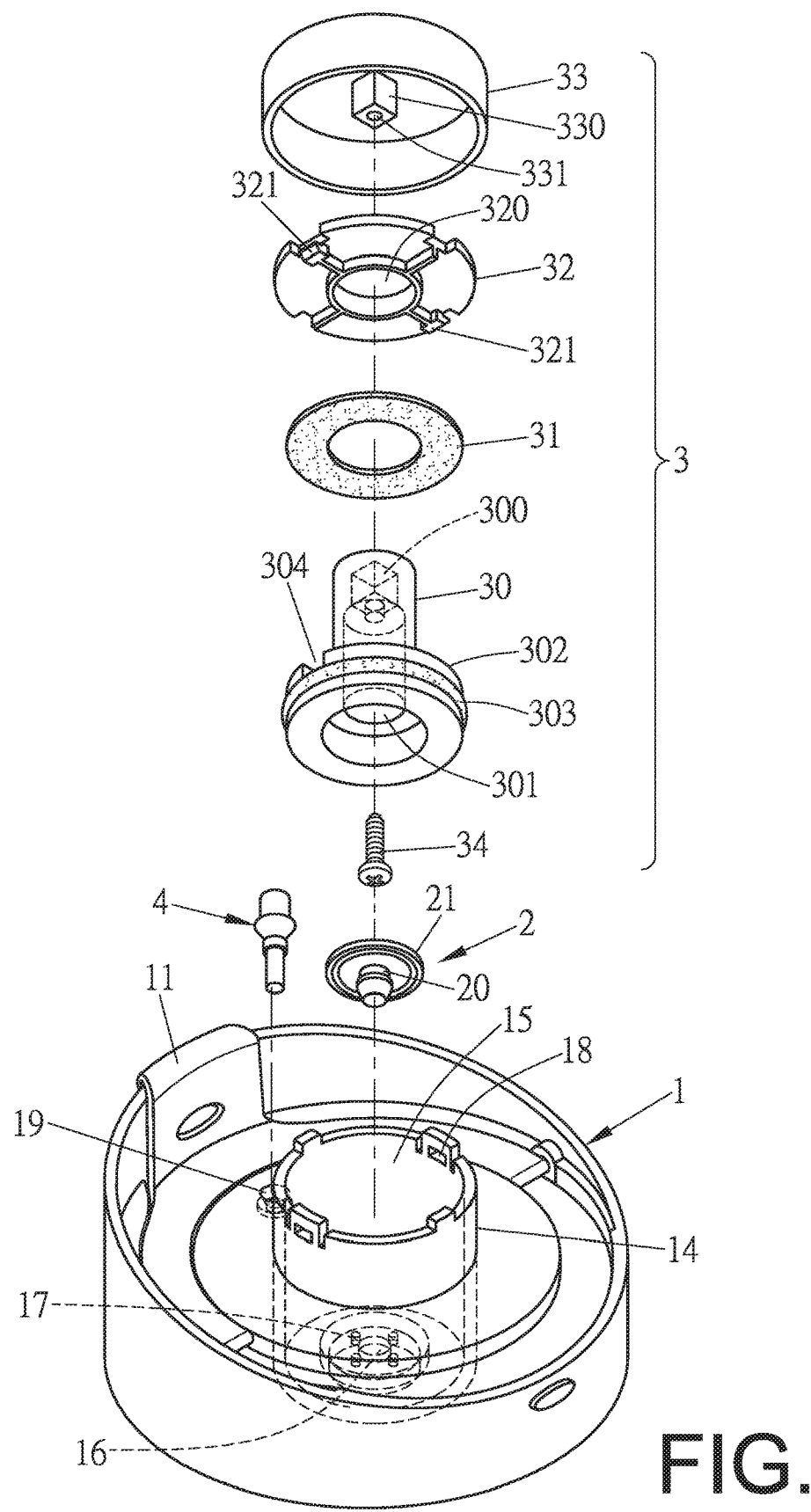
FIG. 1 is an exploded view of the cap of the present invention.
Figure 2:
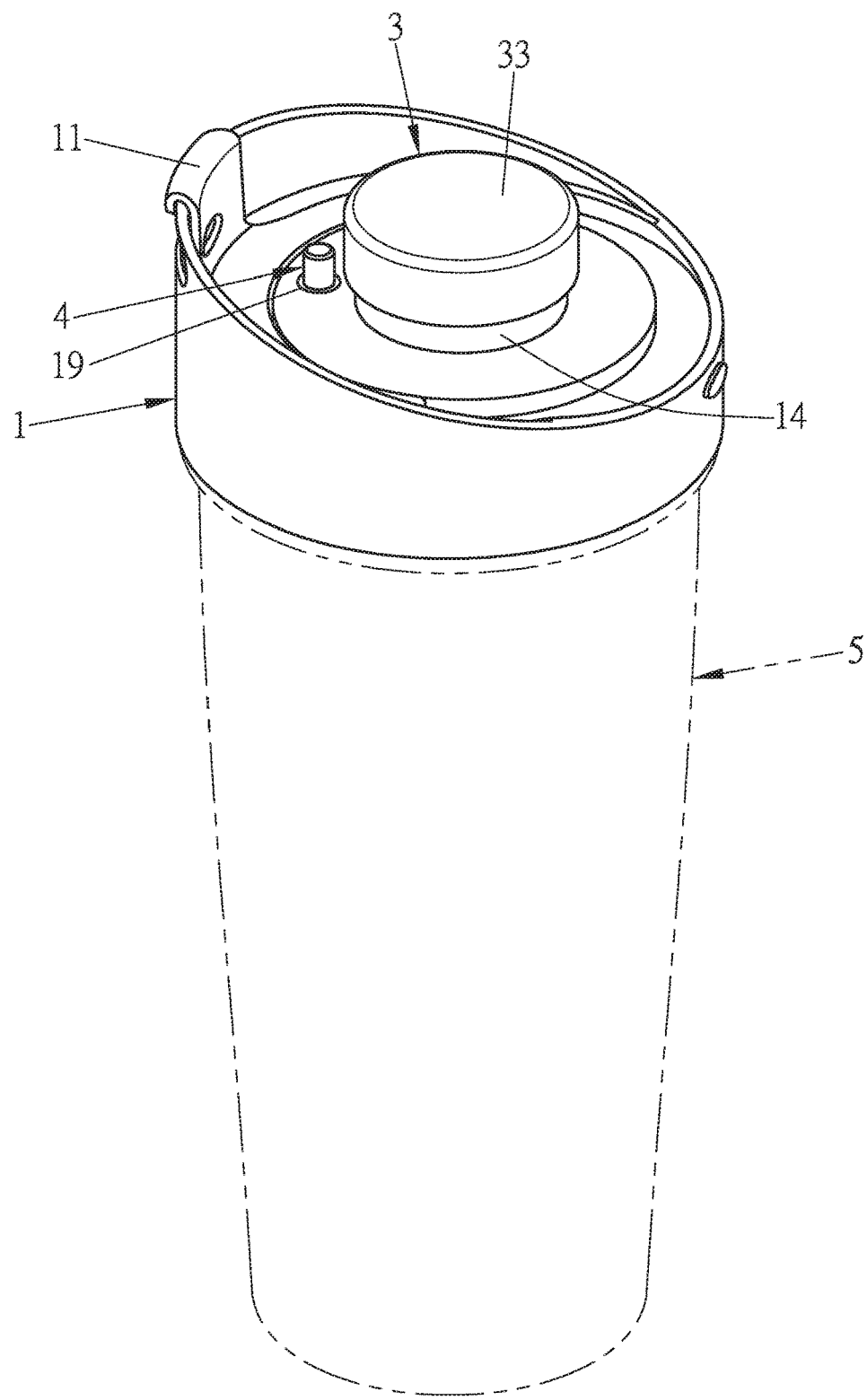
FIG. 2 is a perspective view to show the cap of the present invention mounted to a cup.
Figure 3:
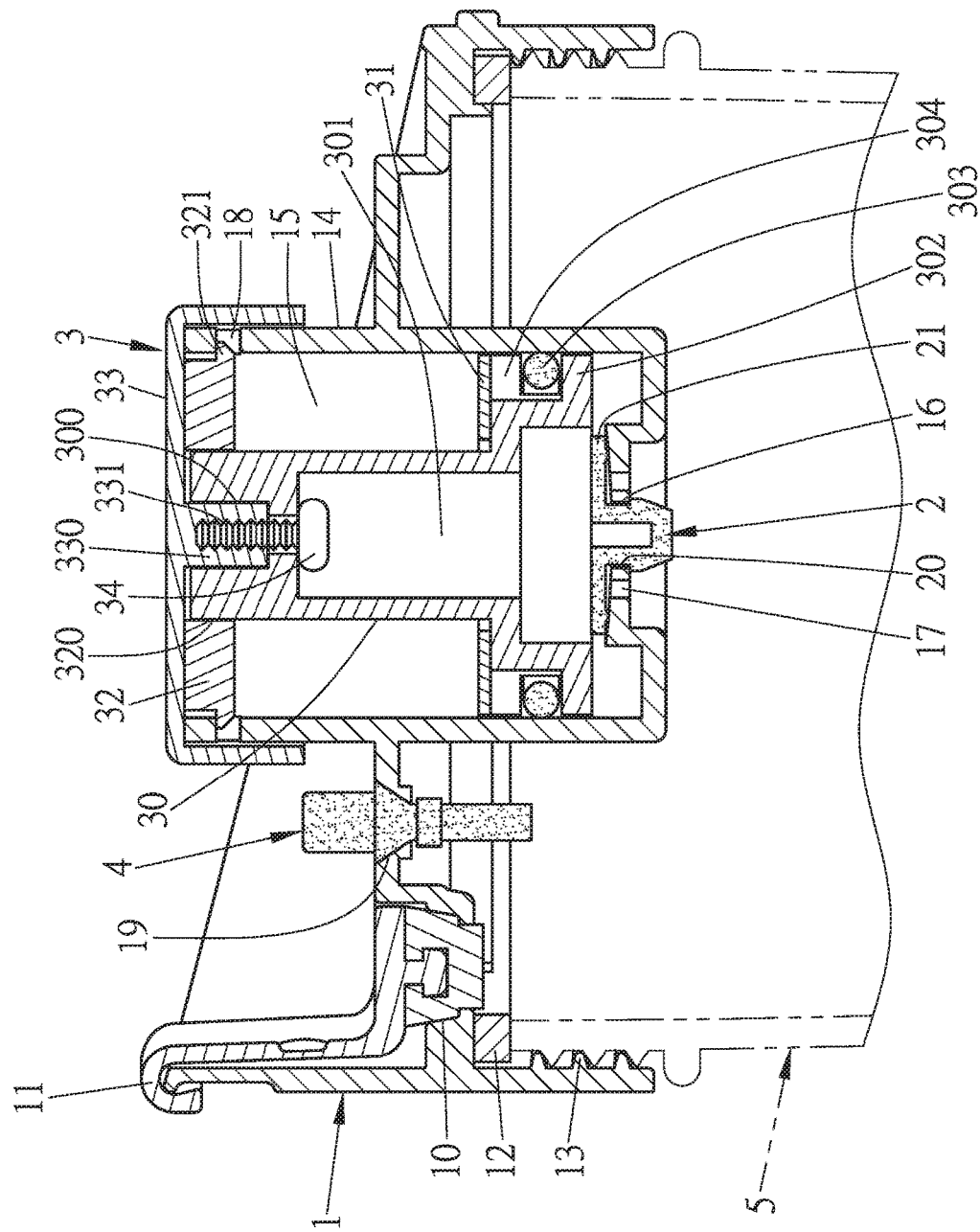
FIG. 3 is a cross sectional view to show that the cap of the present invention is mounted to a cup.

Referring to FIGS. 1 to 3, the cap 1 of the present invention comprises an outlet 10 as shown in FIG. 3, and a cover 11 is pivotably connected to the top of the cap 1 so as to cover the outlet 10. A sealing member 12 is connected the inside of the cap 1, and inner threads 13 are formed in the inside of the cap 1. The cap 1 is threadedly mounted to a cup 5 as shown in FIG. 3 and the sealing member 12 seals the periphery of the open top of the cup 5. A piston seat 14 is connected to the cap 1 and a room 15 is defined in the piston seat 14. The piston seat 14 includes an aperture 16 and multiple air paths 17 defined through the lower end thereof. At least two lugs extend from the top end of the position seat 14 and each lug includes a slot 18. The cap 1 further has a pressure-release hole 19.

A check valve 2 is engaged with the aperture 16 in the lower end of the piston seat 14 and has a plate 21 extending radially therefrom. The plate 21 is deformable to cover the at least one air path 17. The check valve 2 includes an annular groove 20 with which the periphery of the aperture 16 is engaged.

A suction device 3 is located in the piston seat 14 and comprises a position rod 30, a washer 31, a positioning member 32, a handle 33 and a bolt 34. The piston rod 30 is connected to the handle 33. Specifically, the piston rod 30 of the suction device 3 has a recess 300 defined in the end face of the upper end thereof, and a stepped hole 301 is defined in the piston rod 30 and communicates with the recess 300. The handle 33 has an insertion 330 which is inserted into the recess 300. The insertion 330 has a threaded hole 331. A bolt 34 extends through the lower end of the piston rod 30 and is threadedly connected to the threaded hole 331 via the stepped hole 301 so as to connect the handle 33 to the piston rod 30. The handle 33 can also be simply glued to the upper end of the piston rod 30. A pressure-release pin 4 is located in the pressure-release hole 19 of the cap 1.

The piston rod 30 is further connected to a piston head 302 and a seal ring 303 is mounted to the piston head 302.

A washer 31 is mounted to the piston rod 30 of the suction device 3 and located on the piston head 302. The piston head 302 is located in the room 15 of the piston seat 14 and the seal ring 303 contacts the inside of the room 15. The piston head 302 has at least one notch 304 defined therein. The positioning member 32 is connected to the top end of the piston seat 14 and has a passage 320 through which the piston rod 30 extends. The positioning member 32 has at least two studs 321 on the outside thereof, and the at least two studs 321 are engaged with the at least two slots 18 of the piston seat 14 to fix the positioning member 32 to the piston seat 14.

Figure 4:
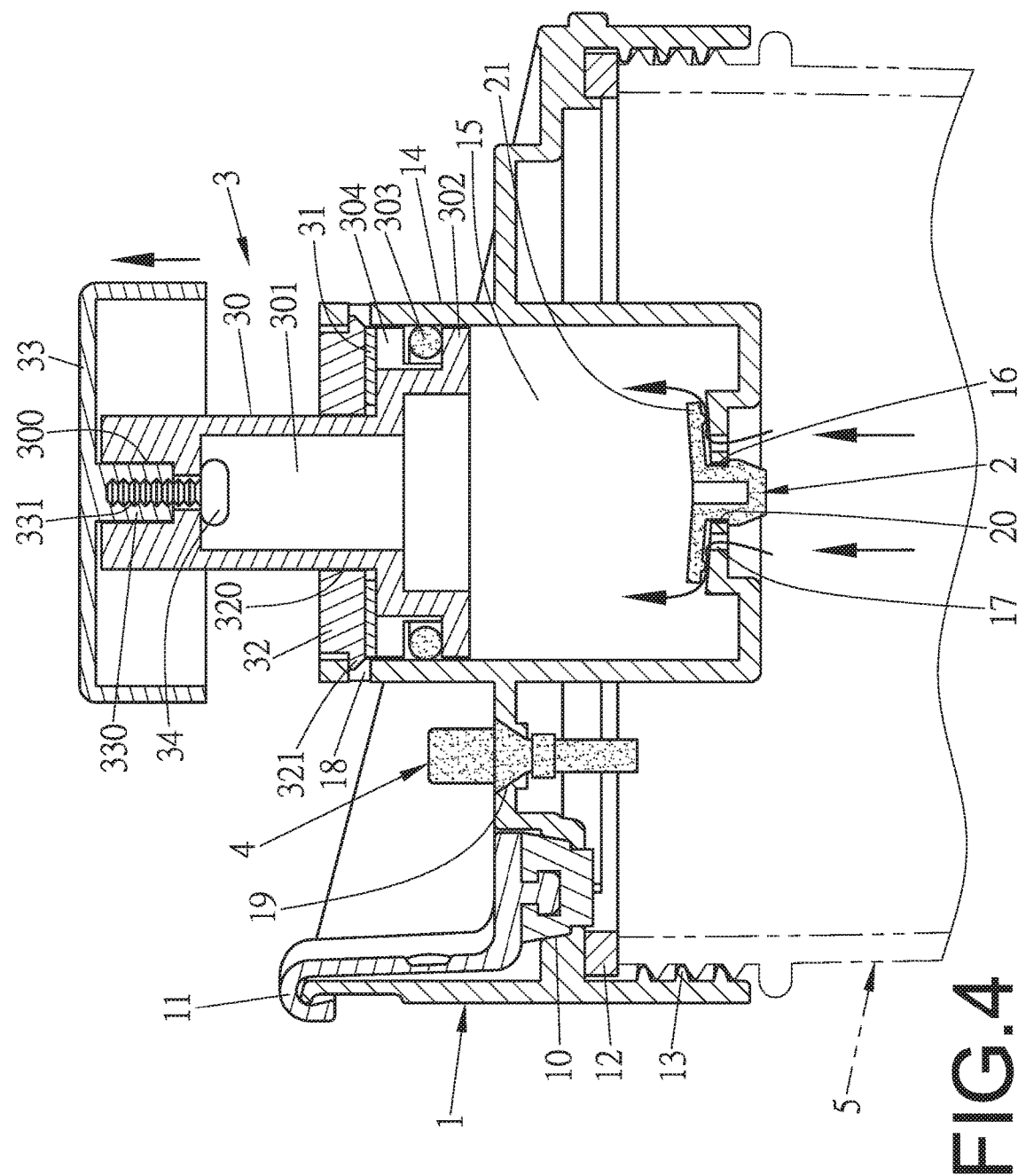
FIG. 4 is a cross sectional view to show that the suction device of the cap of the present invention is operated to suck air into the room of the piston seat.
Figure 5:
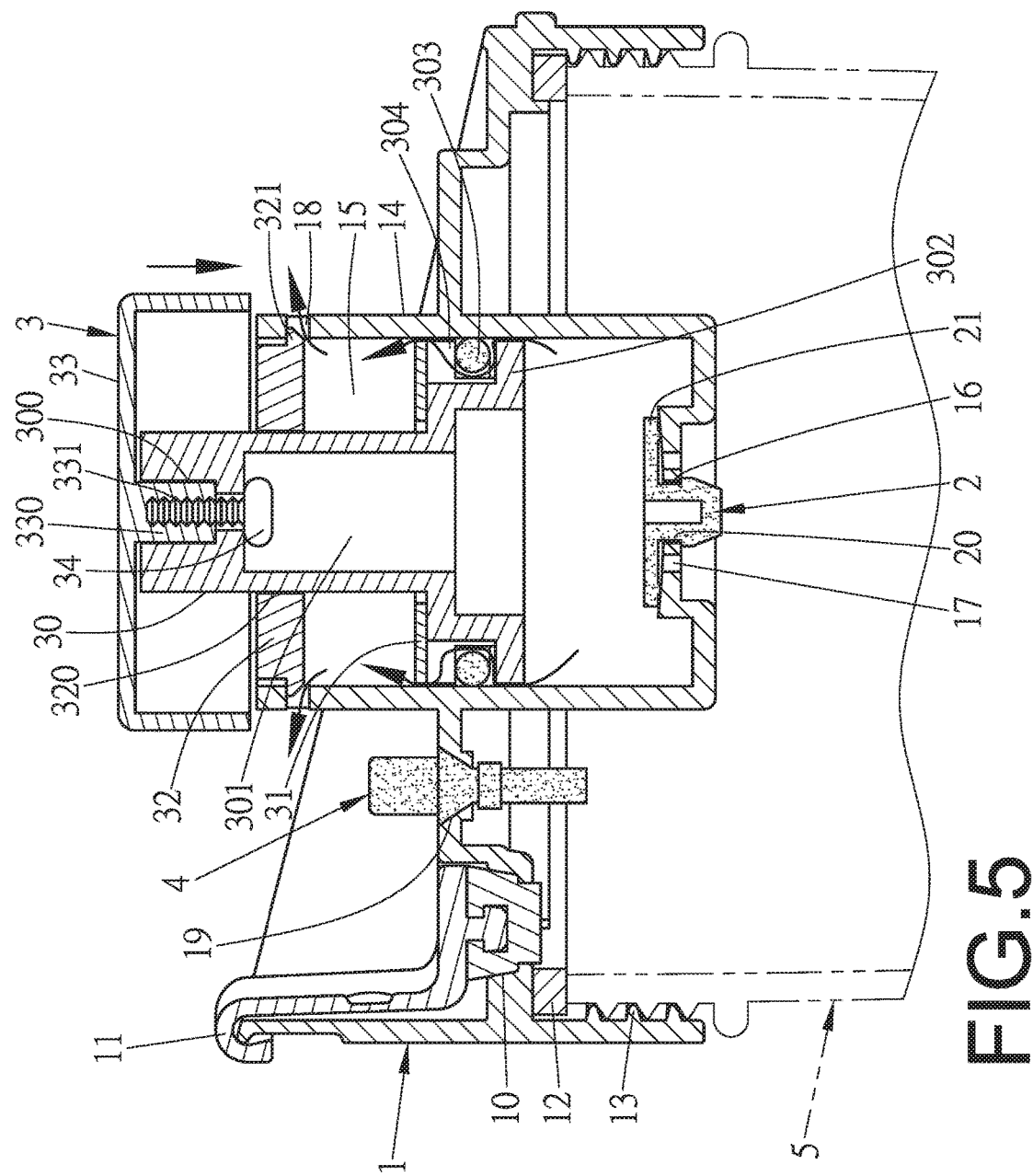
FIG. 5 is a cross sectional view to show that the suction device of the cap of the present invention is operated to release the air from the cup.

As shown in FIGS. 3 to 5, when the user wants to suck the air in the cup 5 out from the cap 1, he or she holds the handle 33 and pulls the handle 33 upward as shown in FIG. 4, the piston rod 30 is moved in the room 15 of the piston seat 14, and the seal ring 303 is snugly in contact with the inside of the room 15. Therefore, a negative pressure is formed in the room 15 so as to suck the air in the cup 5 upward. The air passes through the air paths 17 and pushes the plate 21 of the check valve 2 upward such that a gap is formed between the plate 21 and the inner bottom of the piston seat 14. The air in the cup 5 flows through the gap and enters into the room 15. It is noted that the washer 31 mounted onto the piston rod 30 provides a buffering feature to avoid the piston head 302 from hitting the positioning member 32 too hard.

When pushing the handle 33 downward as shown in FIG. 5, the seal ring 303 on the piston head 302 is slightly moved upward by friction between the inside of the room 15 and the seal ring 303 on the piston head 302, so that a gap is formed between the seal ring 303 and the piston head 302. The air in the room 15 is squeezed by the piston head 302 and then passes through the gap and the at least one notch 304, and releases from the at least two slots 18. In other words, by pulling and pushing of the piston rod 30, the air in the cup 5 can be sucked out, and the freshness of the beverage in the cup 5 can be kept for a longer period of time.

Figure 6:
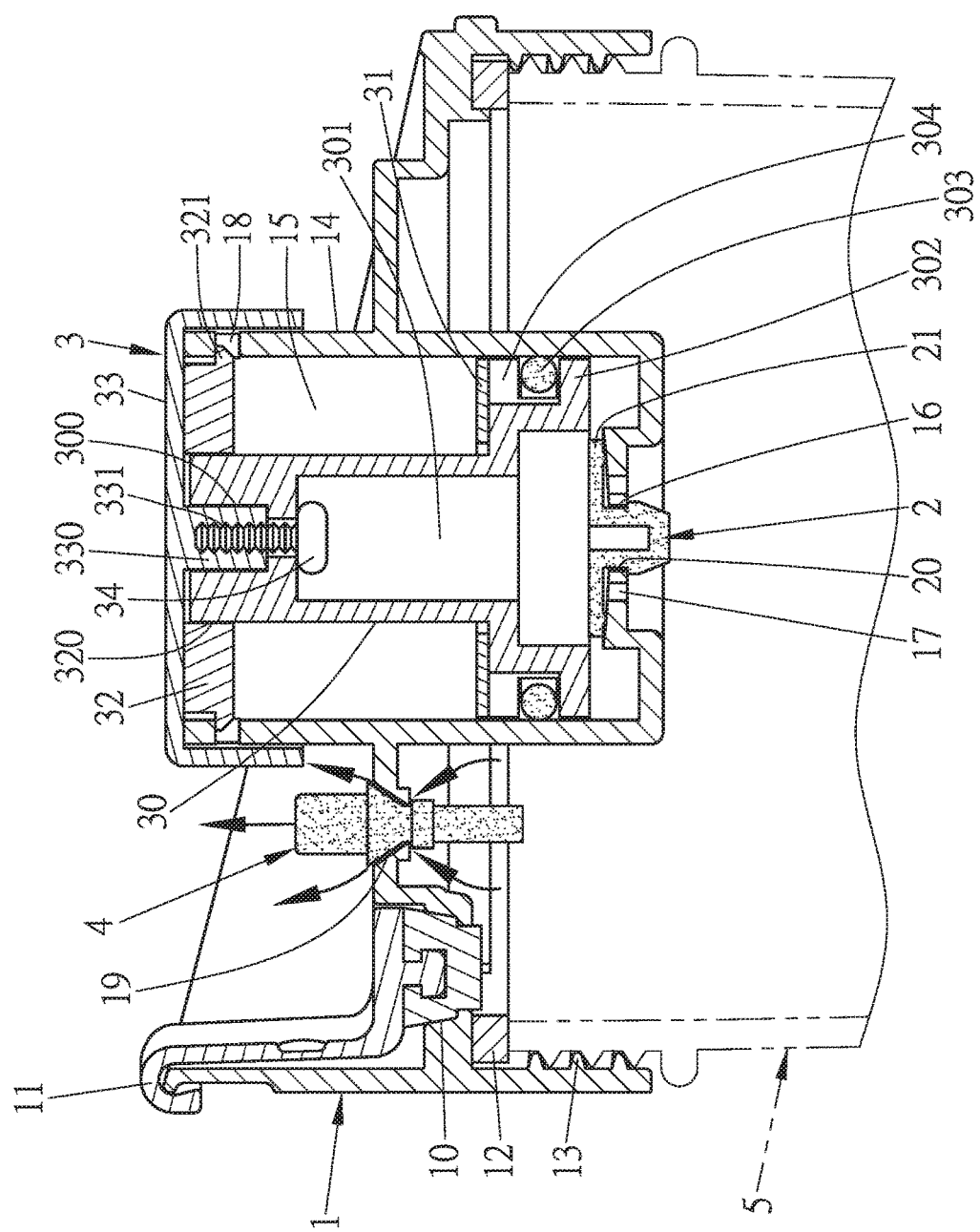
FIG. 6 shows that the pressure-release pin is pulled upward relative to the cap of the present invention.

The cap 1 has its own suction device 3 which is easily operated. The suction device 3 does not need extra space to be stored or carried. When the users want to open the cover 11 of the cap 1 after the air in the cup 5 is sucked out, as shown in FIG. 6, the pressure-release pin 4 is pulled upward to create a gap between the periphery of pressure-release hole 19 and the pressure-release pin 4, so that the pressure in the cup 5 and the ambient pressure reach a balance, and the cover 11 can be opened relative to the cap 1.

While we have shown and described the embodiment in accordance with the present invention, it should be clear to those skilled in the art that further embodiments may be made without departing from the scope of the present invention.

What is claimed is:

1. A cap for a cup, comprising:
    a piston seat connected to the cap and having a room defined therein, an aperture and multiple air paths defined through a lower end of the piston seat, at least two slots defined in a top end of the position seat;
    a check valve engaged with the aperture in the lower end of the piston seat and having a plate which is deformable to cover the air paths, and
    a suction device located in the piston seat and comprising a position rod, a positioning member and a handle, the piston rod connected to the handle, the piston rod comprising a piston head on the lower end thereof and a seal ring mounted to the piston head, the piston head having at least one notch defined therein, the piston head located in the room of the piston seat, an upper end of the piston rod protruding beyond the top end of the piston seat, the positioning member mounted to the top end of the piston seat and having a passage through which the piston rod extends, the positioning member having at least two studs, the at least two studs engaged with the at least two slots of the piston seat to fix the positioning member to the piston seat.

2. The cap as claimed in claim 1, wherein the piston rod of the suction device has a washer mounted thereto.

3. The cap as claimed in claim 1, wherein the piston rod of the suction device has a recess defined in an end face of the upper end thereof, a stepped hole is defined in the piston rod and communicates with the recess, the handle has an insertion which is inserted into the recess, the insertion has a threaded hole, a bolt extends through the lower end of the piston rod and is threadedly connected to the threaded hole via the stepped hole so as to connect the handle to the piston rod.

4. The cap as claimed in claim 1, wherein the cap includes a pressure-release hole and a pressure-release pin is located in the pressure-release hole.

\* \* \* \* \*